United States Patent
Yanagisawa

(10) Patent No.: US 10,650,047 B2
(45) Date of Patent: May 12, 2020

(54) DENSE SUBGRAPH IDENTIFICATION

(71) Applicant: International Business Machines Corporation, Armonk, NY (US)

(72) Inventor: Hiroki Yanagisawa, Sumida-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 719 days.

(21) Appl. No.: 14/645,709

(22) Filed: Mar. 12, 2015

(65) Prior Publication Data

US 2016/0267199 A1   Sep. 15, 2016

(51) Int. Cl.
G06F 16/901   (2019.01)

(52) U.S. Cl.
CPC .............................. G06F 16/9024 (2019.01)

(58) Field of Classification Search
None
See application file for complete search history.

(56) References Cited

U.S. PATENT DOCUMENTS

| | | | |
|---|---|---|---|
| 2011/0173189 A1* | 7/2011 | Singh | G06F 17/30958 707/722 |
| 2013/0226840 A1 | 8/2013 | Zhang et al. | |
| 2014/0006503 A1 | 1/2014 | Serafini et al. | |
| 2014/0037227 A1* | 2/2014 | Zhang | G06K 9/6219 382/286 |
| 2014/0337562 A1* | 11/2014 | Long | G06F 3/0659 711/103 |
| 2015/0019592 A1* | 1/2015 | Jin | G06F 17/10 707/798 |
| 2015/0106069 A1* | 4/2015 | Gielis | G06T 11/203 703/2 |

OTHER PUBLICATIONS

Asahiro et al.—Greedily finding a dense subgraph. Journal of Algorithms, 34(2):203-221, 2000.
Gallo et al.—A fast parametric maximum flow algorithm and applications. SIAM Journal on Computing, 18(1):30-55, 1989.
Hara et al.,"A Consistent Method for Graph Based Anomaly Localization," published by Proceedings of the 18th International Conference on Artificial Intelligence and Statistics (AISTATS) 2015, San Diego, CA. (333-341).
Tsourakakis et al.—"Denser than the Densest Subgraph: Extracting Optimal Quasi-Cliques with Quality Guarantees," In proceedings of KDD 2013. (pp. 1-9).
Yanagisawa et al., "Axioms of Density: How to Define and Detect the Densest Subgraph," Technical Report, IBM Research—Tokyo, 2016, pp. 1-17.

* cited by examiner

*Primary Examiner* — Kris E Mackes
*Assistant Examiner* — Soheila (Gina) Davanlou
(74) *Attorney, Agent, or Firm* — Cantor Colburn LLP; Vazken Alexanian

(57) ABSTRACT

Embodiments are directed to a computer implemented method of analyzing a graph having a plurality of vertices and edges to identify a subgraph of the graph, wherein the subgraph includes an exact subset. The method includes applying, by a first processor, a heuristic analysis to the graph to determine an initial subset of the graph. The method further includes applying, by either the first processor or a second processor, an exact analysis to the initial subset to determine an exact subset of the initial subset.

17 Claims, 9 Drawing Sheets

$$\max \sum_{ij \in E} l_{ij} \cdot y$$

$$l_{ij} \leq x_i$$

$$l_{ij} \leq x_j$$

$$y \geq \sum_{i \in V} \alpha_k x_i + b_k$$

EXPERIMENTAL RESULTS

| GRAPH NAME | |V| | EXECUTION TIME (SEC.) |
|---|---|---|
| FOOTBALL | 115 | 3.6 |
| CELEGANSNEURAL | 297 | 12.0 |
| bcspwr05 | 443 | 0.9 |
| Erdos991 | 492 | 7.3 |

FIG. 6B

| GRAPH NAME | GREEDY | LOCAL SEARCH | PROPOSED ALGORITHM g(S) |
|---|---|---|---|
| POLBOOKS | 100% | 100% | 100% |
| ADJNOUN | 93% | 99% | 100% |
| FOOTBALL | 100% | 100% | 100% |
| CELEGANSNEURAL | 96% | 91% | 98% |
| bcspwr04 | 100% | 100% | 100% |
| bcspwr05 | 100% | 91% | 100% |

FIG. 7

| DENSITY FUNCTION | a | THE SIZE OF OPTIMUM SOLUTION |
|---|---|---|
| f(S) | 1/3 | 16 |
| f(S) | 2/3 | 8 |
| f(S) | 0.999 | 5 |
| g(S) | 1.1 | 44 |
| g(S) | 1.5 | 8 |
| g(S) | 1.9 | 5 |

{ THE RANGE OF THE SIZES OF THE OPTIMUM SOLUTION IS NOT BROAD (MIN=5 AND MAX=16)

{ THE RANGE OF THE SIZES OF THE OPTIMUM SOLUTION IS BROAD (MIN=5 AND MAX=44)

FIG. 8

DENSE SUBGRAPH IDENTIFICATION

BACKGROUND

The present disclosure relates in general to highly connected subgraphs. More specifically, the present disclosure relates to systems and methodologies for constructing an efficient heuristic algorithm to find a high-quality approximate solution for the densest subgraph problem.

In mathematics and computer science, graph theory is the study of graphs that are mathematical structures used to model so-called "pair-wise" relationships between objects. In its broadest sense, a graph is made up of a set of objects and lines that connect the objects. The objects are often referred to as "nodes" or "vertices," and the lines connecting them are often referred to as "edges." A graph may be undirected, which means that there is no distinction between the two vertices associated with each edge. A graph may also be directed, which means that edges connecting two vertices are directed from one vertex to another. FIG. 1 depicts a diagram illustrating a simplified example of a directed graph having 10 vertices and 13 edges. Graphs can be used to model many types of relations and processes in physical, biological, social and information systems.

A directed graph may be defined as an ordered pair G=(V, E), wherein V represents a set of V vertices, and E represents a set E of edges. In other words, an edge is related with two vertices, and the relation is represented as an unordered pair of vertices with respect to the particular edge. A subgraph of a graph includes a vertex set that is a subset of the vertex set of the graph, as well as an adjacency relation that is a subset of the adjacency relation of the graph.

FIG. 2 depicts a diagram illustrating a simplified example of the so-called densest subgraph problem, wherein given a graph G, a dense subgraph S of graph G must be located. In almost any network, density is an indication of importance. Depending on what properties are being modeled by the graph's vertices and edges, dense regions may indicate high degrees of interaction, mutual similarity, collective characteristics, attractive forces, favorable environments, or critical mass. Thus, a solution to the densest subgraph problem has many applications including social network analysis, biology, physics, information systems, and the like.

SUMMARY

Embodiments are directed to a computer implemented method of analyzing a graph having a plurality of vertices and edges to identify a subgraph of the graph, wherein the subgraph includes an exact subset. The method includes applying, by a first processor, a heuristic analysis to the graph to determine an initial subset of the graph. The method further includes applying, by either the first processor or a second processor, an exact analysis to the initial subset to determine an exact subset of the initial subset.

Embodiments are further directed to a computer system for analyzing a graph having a plurality of vertices and edges to identify a subgraph of the graph, wherein the subgraph includes an exact subset. The system includes a first processor configured to apply a heuristic analysis to the graph to determine an initial subset of the graph. The system further includes either the first processor or a second processor configured to apply an exact analysis to the initial subset to determine an exact subset of the initial subset.

Embodiments are directed to a computer program product for analyzing a graph having a plurality of vertices and edges to identify a subgraph of the graph. The computer program product includes a non-transitory computer readable storage medium having program instructions embodied therewith. The program instructions are readable by at least one processor circuit to cause the processor circuit to perform a method including applying, by a first processor, a heuristic analysis to the graph to determine an initial subset of the graph. The method further includes applying, by either the first processor or a second processor, an exact analysis to the initial subset to determine an exact subset of the initial subset.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

FIG. 6A depicts equations that may be implemented by the system shown in FIG. 3 in accordance with one or more embodiments;

FIG. 6B depicts a chart showing experimental results in accordance with one or more embodiments;

FIG. 7 depicts a chart showing approximation performance results in accordance with one or more embodiments;

FIG. 8 depicts a chart showing results of an experimental comparison of a known density function with a density function of one or more embodiments.

Figure 1:
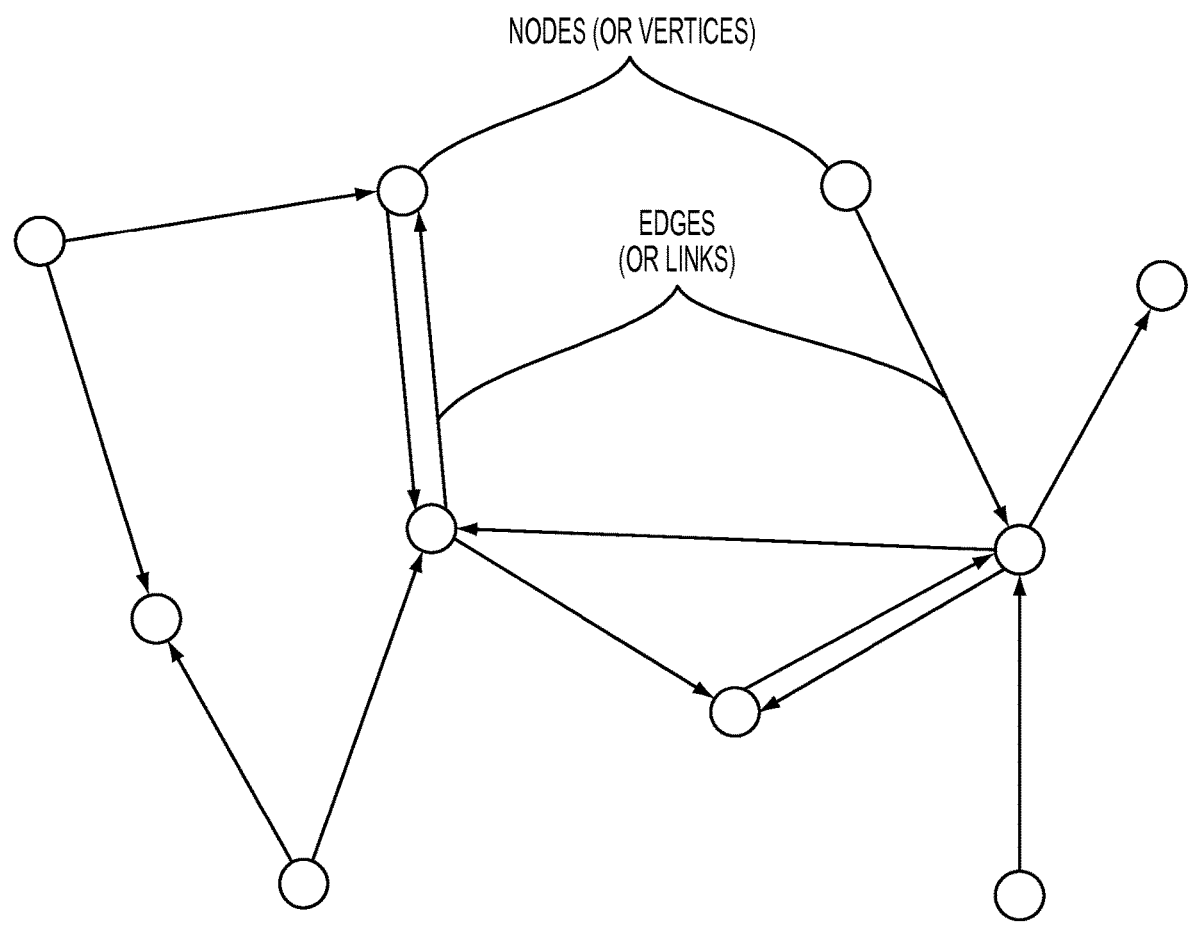
FIG. 1 depicts a diagram illustrating a simplified example of a directed graph.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. For example, although embodiments of the present disclosure are directed to solving the densest subgraph problem, the teachings of the present disclosure may be modified to solve the sparsest subgraph problem. For an unweighted graph, one of the simplest ways to modify the teachings of the present disclosure to solve the sparsest subgraph problem is to take the complement of a given input graph for the sparsest subgraph problem, and then to solve the densest subgraph problem on the complement graph. A complement graph G' of a graph G is the graph such that a pair of vertices is connected in G if and only if the pair of vertices is disconnected in G'. To apply the teachings of the present disclosure to solve the sparsest subgraph problem for a weighted graph requires additional heuristics to convert the teachings of the present disclosure (i.e., the disclosed solution(s) to the densest subgraph problem) to a solution to the sparsest subgraph problem for a weighted subgraph. An example of the sparsest subgraph problem for a weighted graph appears in an anomaly detection problem in a publication written by Satoshi Hara, Tetsuro Morimura, Toshihiro Takahashi, Hiroki Yanagisawa and Taiji Suzuki titled "A Consistent Method For Graph Based Anomaly Localization," published by Proceedings of the 18th International Conference on Artificial Intelligence and Statistics (AISTATS) 2015, San Diego, Calif., the entire disclosure of which is incorporated by reference herein in its entirety. Additionally, although the present disclosure describes the algorithm for an unweighted graph, the teachings of the present disclosure may be extended to a weighted graph. This may be accomplished by, for example, changing the definition of e[S] in the above-identified document from the number of edges in G[S] to the sum of the weights of the edges in G[S]. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

As previously noted herein, FIG. 1 depicts a diagram illustrating a simplified example of a directed graph having 10 vertices and 13 edges. Graphs can be used to model many types of relations and processes in physical, biological, social and information systems. A directed graph may be defined as an ordered pair G=(V, E), wherein V represents a set of V vertices, and E represents a set E of edges. In other words, an edge is related with two vertices, and the relation is represented as an unordered pair of vertices with respect to the particular edge. Graphs can be used to model many types of relations and processes in physical, biological, social and information systems. In computer science, for example, graphs are used to represent networks of communication, data organization, computational devices, the flow of computation, and the like. The link structure of a website can be represented by a directed graph in which vertices represent web pages and directed edges represent links from one page to another. A similar approach can be taken to problems in travel, sociology, biology, chemistry, physics, linguistics, computer chip design, and many other fields.

A subgraph of a graph G is a graph having a vertex set that is a subset of the vertex set of G, and further having an adjacency relation that is a subset of the adjacency relation of G. In other words, a graph H is a subgraph of graph G if graph H contains no vertices or edges that are not in graph G. Thus, if H is a subgraph of G, G contains H, and H is contained in G.

In almost any network, density is an indication of importance. Just as someone reading a road map is interesting in knowing the location of the larger cities and towns, investigators who seek information from abstract graphs are often interested in the dense components of the graph. Depending on what properties are being modeled by the graph's vertices and edges, dense regions may indicate high degrees of interaction, mutual similarity and hence collective characteristics, attractive forces, favorable environments, or critical mass. From a theoretical perspective, dense regions have many interesting properties. Dense components naturally have small diameters (worst case shortest path between any two members). Routing within these components is rapid. A simple strategy also exists for global routing. If most vertices belong to a dense component, only a few selected inter-hub links are needed to have a short average distance between any two arbitrary vertices in the entire network. Commercial airlines employ this hub-based routing scheme. Dense regions are also robust, in the sense that many connections can be broken without splitting the component. A less well-known but equally important property of dense subgraphs comes from percolation theory. If a graph is sufficiently dense, or equivalently, if messages are forwarded from one vertex to its neighbors with higher than a certain probability, then there is very high probability of propagating a message across the diameter of the graph. This fact is useful in everything from epidemiology to marketing.

Figure 2:
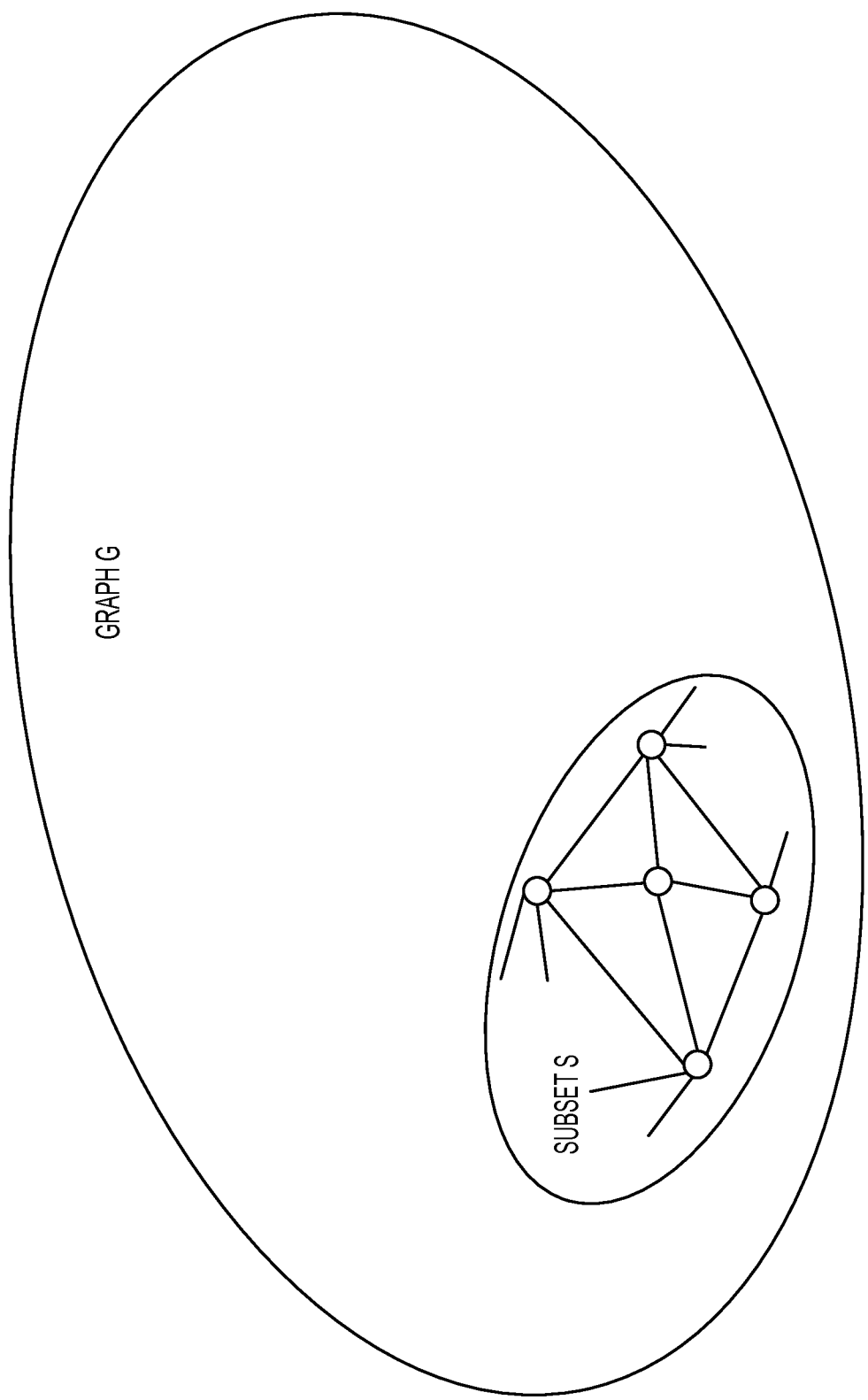
FIG. 2 depicts a diagram illustrating a simplified example of the densest subgraph problem, wherein given a graph G, a dense subgraph S of graph G must be located.

As previously noted herein, FIG. 2 depicts a diagram illustrating a simplified example of the so-called densest subgraph problem, wherein given a graph G, a dense subgraph S of graph G must be located. Thus, the densest subgraph problem is the problem of finding a subgraph of maximum density. There is no unanimous agreement on the definition of the density of a graph or a subgraph. The densest subgraph problem may be defined herein as, given a graph G=(V, E), and given a density function that defines a density of the induced subgraph G[S] by S, find a subset S of vertices V such that the value of the density function is maximized. The density function can be defined in many ways. In general, a graph with a small number of vertices and a large number of edges tends to be regarded as "dense," and, in contrast, a graph with a large number of vertices and a small number of edges tends to be regarded as "sparse." However, there is no agreement on a preference between a graph with a small number of vertices and a small number of edges vs. a graph with a large number of vertices and a large number of edges. One example of the definition of the density function f(S) is $f(S)=e[S]-a|S|(|S|-1)/2$, where e[S] is defined as the number of edges in G[S] and "a" is a fixed parameter. The parameter "a" is introduced to control the preference between the two graphs. If parameter "a" is set to a small value, then a large graph will be regarded as a denser graph than a small graph. In contrast, if parameter "a" is set to a large value, then a small graph will be regarded as a smaller graph than a large graph. The parameter "a" is selected depending on an application and/or a user's preference. The densest subgraph problem using the above-described known density function definition may be described as NP-hard, which means that it is hard to construct an efficient algorithm to find the optimum solution. Under the above-described known definition of f(S), it has been recommended that parameter "a" is set such that $\frac{1}{3}<=a<1$. Additional details of the above-described definition of f(S) are found in a publication written by C. E. Tsourakakis, F. Bonchi, A. Gionis, F. Gullo, and M. A. Tsiarli, titled "Denser Than The Densest Subgraph: Extracting Optimal Quasi-Cliques with Quality Guarantees," published in Proceedings of KDD (2013), the entire disclosure of which is incorporated by reference herein.

Turning now to an overview of the present disclosure, one or more embodiments herein relate to highly connected subgraphs, and more specifically to systems and methodologies for constructing an efficient heuristic algorithm to find a high-quality approximate solution for the densest subgraph problem. In many applications, the number of vertices V in graph G can often exceed one million. In such cases, it is both extremely difficult and very time consuming to construct an exact algorithm that finds the optimum solution to an optimization problem (i.e., the densest subgraph) in graph G. However, it is possible to construct an efficient exact algorithm for relatively small graphs, wherein the number of vertices is no more than approximately five-hundred (500). It is therefore likely that the optimum solution (i.e., the densest subgraph) is even smaller. For example, a typical size of an optimum solution most likely has between 10 and 50 vertices, and the largest optimum solution most likely has no more than approximately 200 vertices. Thus, one or more embodiment of the present disclosure operate to find an initial, suitable subset so that S overlaps considerably with the optimum solution. In other words, most of the vertices in the optimum solution are contained in S. One or more embodiments of the present disclosure then find a subset S*. It is postulated by the present disclosure that the subset S* is substantially identical to the optimum solution.

In one or more embodiments, a new density function g(S) is proposed, wherein $g(S)=e[S]/|S|^a$, and wherein "a" is a fixed parameter. The parameter "a" is introduced to control the preference between the two graphs. If parameter "a" is set to a small value, then a large graph will be regarded as a denser graph than a small graph. In contrast, if parameter "a" is set to a large value, then a small graph will be regarded as a smaller graph than a large graph. The parameter "a" is selected depending on an application and/or a user's preference. The densest subgraph problem using the above-described known density function definition may be described as NP-hard, which means that it is hard to construct an efficient algorithm to find the optimum solution. In contrast to the above-described definition of f(S), using the disclosed embodiments of g(S), wherein $g(S)=e[S]/|S|^a$, parameter "a" is set such that $1<=a<=2$. As described in more detail later in this disclosure, the disclosed embodiments of g(S) is superior to the known definition of the density function f(S) because the range of the sizes of the optimum subgraphs in response to changes to the parameter "a" is wider for g(S) than the known f(S) density function described herein. Thus, the present disclosure provides a heuristic algorithm that first selects a set of vertices that qualify as an initial, quality dense subgraph candidate, and then selects an optimum subset of vertices from the initial, quality dense subgraph candidate. As will be described and illustrated in more detail later in this disclosure, it has been found that the range of the sizes of the optimum solution obtained by g(S) is considerably broader than the range of sizes of the optimum solution obtained by f(S).

Figure 3:
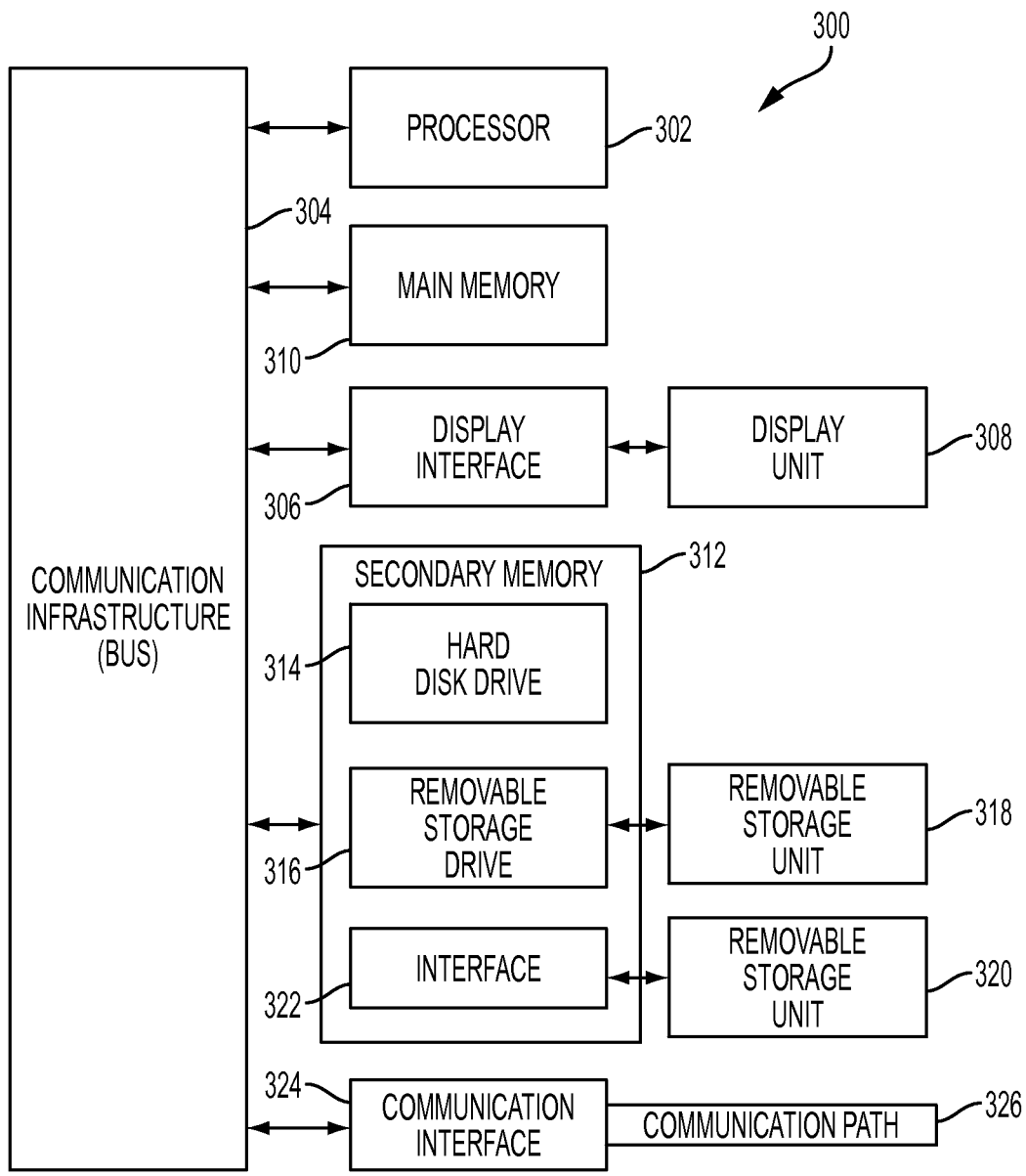
FIG. 3 depicts an exemplary computer system capable of implementing one or more embodiments.

Turning now to the drawings in greater detail, wherein like reference numerals indicate like elements, FIG. 3 illustrates a high level block diagram showing an example of a computer-based information processing system 300 useful for implementing one or more embodiments of the present disclosure. More specifically, system 300 may be used in the development and transformation of graphs using computer-based graph rewrite systems. Complementary to graph transformation systems focusing on rule-based in-memory manipulation of graphs, system 300 may also implement and/or access graph databases geared towards transaction-safe, persistent storing and querying of graph-structured data. Although one exemplary computer system 300 is shown, computer system 300 includes a communication path 326, which connects computer system 300 to additional systems (not depicted) and may include one or more wide area networks (WANs) and/or local area networks (LANs) such as the Internet, intranet(s), and/or wireless communication network(s). Computer system 300 and additional system are in communication via communication path 326, e.g., to communicate data between them. Thus, various aspects of the present disclosure may be carried out by either one processor circuit or multiple processor circuits working together.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In alternative embodiments, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310 and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
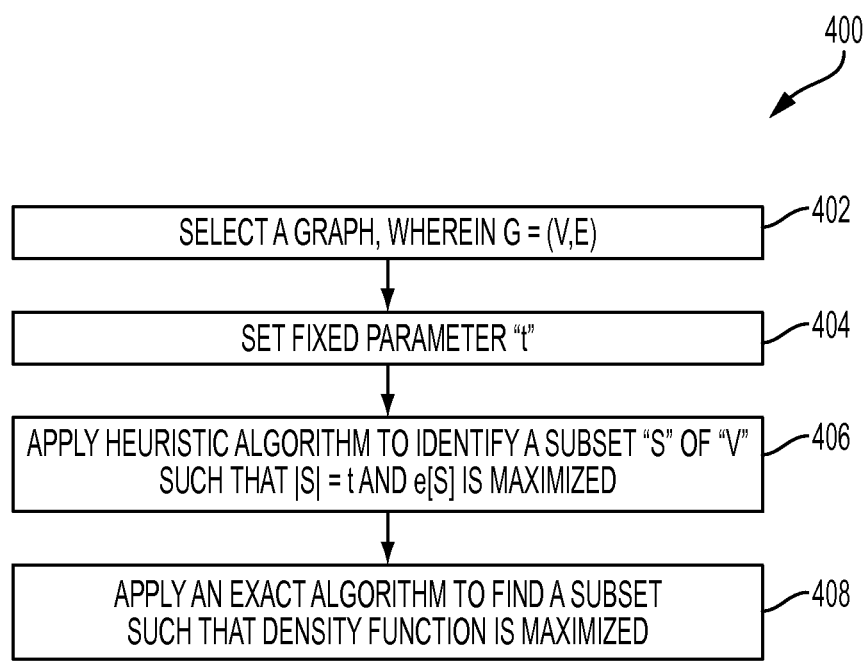
FIG. 4 depicts a flow diagram illustrating a methodology in accordance with one or more embodiments.

FIG. 4 depicts a flow diagram illustrating a methodology 400 in accordance with one or more embodiments. As previously noted herein, in many applications, the number of vertices V in graph G can often exceed one million. In such cases, it is practically impossible to construct an exact algorithm that finds the optimum solution (i.e., the densest subgraph) in graph G. However, it is possible to construct an efficient exact algorithm for relatively small graphs, wherein the number of vertices is no more than approximately five-hundred (500). It is therefore likely that the optimum solution (i.e., the densest subgraph) is even smaller. For example, a typical size of an optimum solution most likely has between 10 and 50 vertices, and the largest optimum solution most likely has no more than approximately 200 vertices. Thus, methodology 400 operates to find an initial, suitable subset S in block 406 so that S overlaps considerably with the optimum solution. In other words, most of the vertices in the optimum solution are contained in S. Methodology 400 then finds in block 408 a subset S. It is postulated by the present disclosure that S* is almost identical to the optimum solution.

Turning now to a more detailed description of FIG. 4, methodology 400 begins at block 402 by selecting a graph G=(V, E). In block 404, fixed parameter "t" is set. For example, in one or more disclosed embodiments, "t" may be set between approximately three-hundred (300) and approximately five-hundred (500). If "t" is set to a large number (e.g., t=500), methodology 400 will produce a relatively higher quality solution but will take a relatively longer time to compute an output. In contrast, if "t" is set to a small number (e.g., t=300), methodology 400 might produce a relatively lower quality solution but will take relatively less time to compute an output. In block 406, a heuristic algorithm is applied in order to identify a subset "S" of "V" such that |S|=t and e[S] is maximized. The term heuristic is used for algorithms which find solutions among all possible ones, but they do not guarantee that the best will be found, therefore they may be considered as approximate and not accurate/exact algorithms. These algorithms usually find a solution close to the best one and they find it fast and easily. Sometimes these algorithms can be accurate, that is they actually find the best solution, but the algorithm is still called heuristic until this best solution is proven to be the best. The method used from a heuristic algorithm is one of the known methods, such as greediness, but in order to be easy and fast the algorithm ignores or even suppresses some of the problem's demands.

In theory, if the exact algorithm of block 408 were applied directly to graph G of block 402 to obtain the optimum solution, such an approach would take a very long time to obtain a dense subgraph solution for a large graph (e.g., a graph more than approximately 500 vertices). Application of a heuristic algorithm as shown in block 406 quickly obtains a suitable, good approximate solution by identifying a subset "S" of "V" such that |S|=t and e[S] is maximized. One method of implementing block 406 is through application of a greedy search algorithm, an example of which is disclosed in a publication written by Y. Asahiro, K. Iwama, H. Tamaki, and T. Tokuyama, titled "Greedily Finding A Dense Subgraph," published in the Journal of Algorithms, 34(2):203-221 (2000), the entire disclosure of which is incorporated by reference in its entirety. The greedy search algorithm disclosed by Asahiro et al. receives a set of vertices V as an initial solution, and repeatedly improves S by removing a vertex from S. Given an n-vertex graph with nonnegative edge weights and a positive integer k≤n, the goal is to find a k-vertex subgraph with the maximum weight. It is noted that the positive integer "k" is substantially the same as parameter "t" of block 404. The following greedy algorithm is applied to the problem by repeatedly remove a vertex with the minimum weighted-degree in the currently remaining graph until exactly k vertices are left. Tight bounds are derived on the worst case approximation ratio R of the following greedy algorithm: $(\frac{1}{2}+n/2k)^2 - O(n^{-1/3}) \leq R \leq (\frac{1}{2}+n/2k)^2 + O(1/n)$ for k in the range $n/3 \leq k \leq n$ and $2(n/k+1) - O(1/k) \leq R \leq 2(n/k+1) + O(n/k2)$ for $k < n/3$. For $k = n/2$, for example, these bounds are $9/4 \pm O(1/n)$, improving on naive lower and upper bounds of 2 and 4, respectively. The upper bound for general k compares well with currently available and much more complicated approximation algorithms based on semi-definite programming.

In block 408, an exact algorithm is applied to find the subset "S*" such that a value of a given density function (such as f(S) and g(S)) is maximized. In other words, methodology 400 now finds through block 408 a subset S* that is almost identical to the optimum solution. The implementation of block 408 depends on the implementation of the density function. If the density function f(S) is defined in a form of a linear combination of two functions (e.g., f(S)=e[S]−k h(S)), then block 408 of methodology 400 may be implemented using a mathematical programming solver such as IBM ILOG CPLEX. However, if the density function g(S) is defined in the form of a ratio of two functions (e.g., g(S)=e[S]/h(S) where h(S) is a penalty function), block 408 may use a so-called fractional programming technique to obtain the optimum solution by solving the densest subgraph problem using a density function of a form of linear combination of the two functions (e.g., f(S)=e[S]−k h(S) where k is a fixed parameter) several times. Additional details of a suitable fractional programming technique are disclosed in a publication authored by G. Gallo, M. D. Grigoriadis, and R. E. Tarjan, titled "A Fast Parametric Maximum Flow Algorithm And Applications, published by SIAM Journal on Computing, 18(1):30-55 (1989), the entire disclosure of which is incorporated herein by reference.

Figure 5:
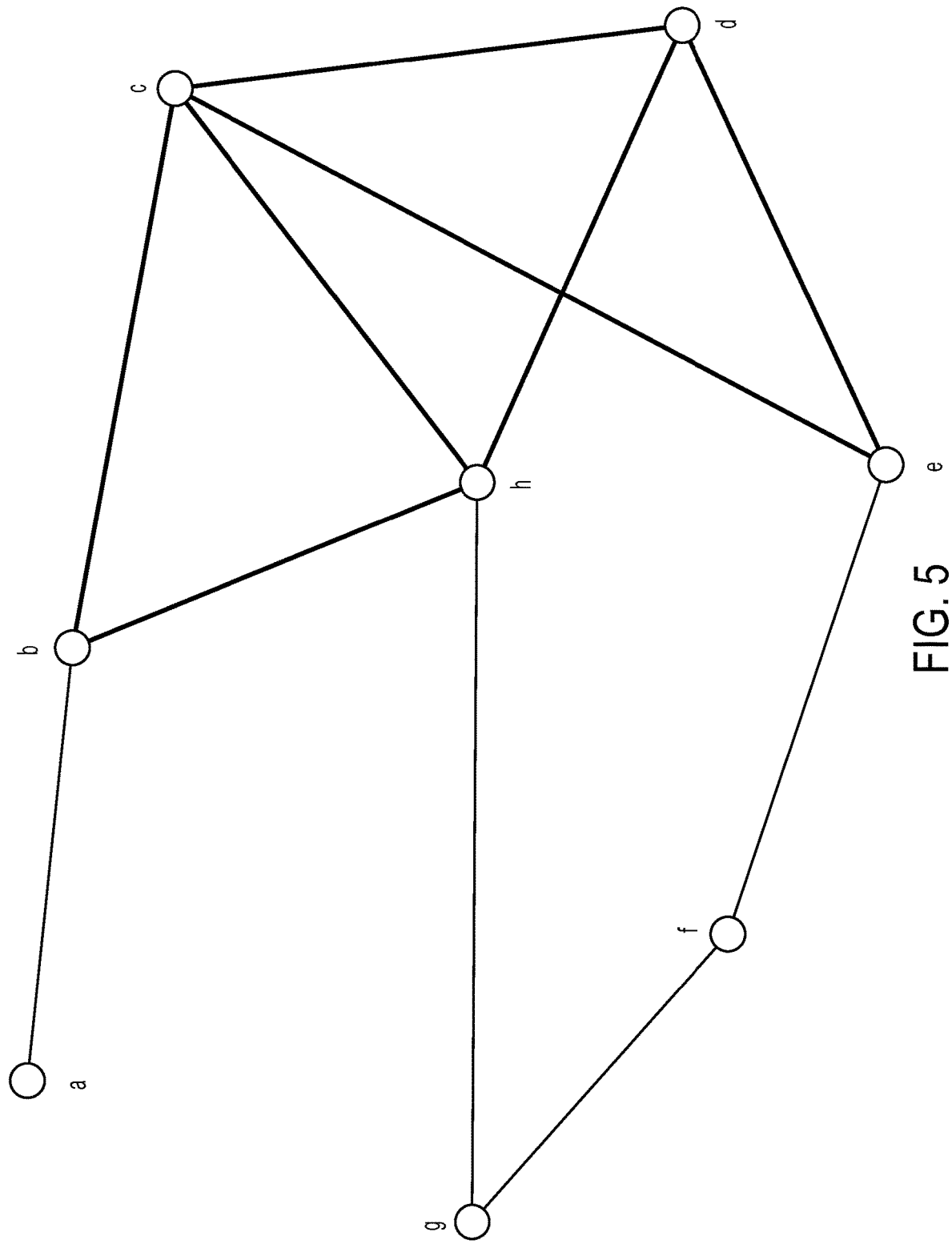
FIG. 5 depicts a diagram illustrating an example application of the methodology shown in FIG. 4 in accordance with one or more embodiments.

FIG. 5 depicts a diagram illustrating an example application of methodology 400 shown in FIG. 4. Starting with the graph shown in FIG. 5 as an input to methodology 400, f(S) is set to e[S]−0.4|S|(|S|−1)/2, and the parameter "t" is set to 6 at block 404. Following block 406, the greedy algorithm described in the previously identified publication written by Y. Asahiro, K. Iwama, H. Tamaki, and T. Tokuyama, titled "Greedily Finding A Dense Subgraph," published in the Journal of Algorithms, 34(2):203-221 (2000), is applied. This greedy algorithm repeatedly removes a vertex with the smallest degree until the number of vertices is equal to the parameter "t." Thus, this algorithm removes vertex "a" (because the degree of vertex "a" is one (1) and this vertex has the smallest degree among the eight (8) vertices.). The greedy algorithm removes vertex "g" (because the degree of vertex "g" is two (2) and this is the smallest). It should be noted that there are other vertices with degree two (2), and vertex "g" is removed just because of an arbitrarily choice of one vertex. After the second removal of the vertex, the number of vertices in the graph shown in FIG. 5 becomes 6, and block 406 of methodology 400 finishes. The graph is now at S={b, c, d, e, f, h}. Block 408 of methodology 400 is then executed. In block 408, the mathematical programming formulation is solved to find an optimum vertex set S* from S. Note that the mathematical programming formulation is depicted in FIG. 6A of the present disclosure. The result will be S*={b, c, d, e, h} as an optimum solution.

An example of how block 408 may be implemented will now be provided with reference to FIGS. 6A and 6B. FIG. 6A depicts equations that may be implemented by the system shown in FIG. 3 in accordance with one or more embodiments, and FIG. 6B depicts a chart showing experiment results in accordance with one or more embodiments. The graphs shown in FIG. 6B (football, celegansneural, bcspwr05 and Erdos991) are known graph datasets. The illustrated examples find S* that maximizes the density function $f(S)=e[S]-a|S|(|S|-1)/2$, which is found using the mathematical programming depicted in FIG. 6A. Let $h(x)=ax(x-1)/2$, then this function can be expressed as a piecewise-linear function because variable x takes integer values between 2 and $|V|$. Therefore, the problem of finding S* that maximizes the density function $f(S)=e[S]-a|S|(|S|-1)/2$ can be formulated as an integer linear programming, which is shown in FIG. 6A. In this integer programming, variable $x_i$ takes the value one (1) when vertex i is in V, and takes the value zero (0) otherwise. Variable $l_{ij}$ takes the value one (1) when $x_i=x_j=1$ for (i,j) in E, and takes the value zero (0) otherwise.

FIG. 7 depicts a table showing approximation performance results in accordance with one or more embodiments. More specifically, the table shown in FIG. 7 illustrates the approximation performances of the greedy algorithm, the local search algorithm, and an algorithm in accordance with one or more embodiments of the present disclosure, wherein the density function $g(S)=e[S]/|S|^{1.7}$ is used. The graphs shown in FIG. 7 (polbooks, adjnoun, football, celegansneural, bcspwr04 and bcspwr05) are known graph datasets. The higher the percentages represent better solutions. A value of 100% means that the obtained solution is optimum. The greedy algorithm and the local search algorithm are described in the previously identified publications written by Y. Asahiro, K. Iwama, H. Tamaki, and T. Tokuyama, titled "Greedily Finding A Dense Subgraph," published in the Journal of Algorithms, 34(2):203-221 (2000) and C. E. Tsourakakis, F. Bonchi, A. Gionis, F. Gullo, and M. A. Tsiarli, titled "Denser Than The Densest Subgraph: Extracting Optimal Quasi-Cliques with Quality Guarantees," published in Proceedings of KDD (2013), the entire disclosures of which are incorporated by reference in their entirety.

FIG. 8 depicts a chart showing results of an experimental comparison of a known density function with a density function of one or more embodiments. More specifically, the chart in FIG. 8 shows the results of an experimental comparison of known density function f(S) with a density function g(S) in accordance with one or more embodiments. The experimental results were performed on a workstation, with an Intel Xeon (E5540) with 8 cores running at 2.53 GHz, with 52 GB of RAM and Red Hat Enterprise Linux Workstation 6.4. The programs to implement the experiment were written C++ and used the gcc 4.4.7 compiler with the –O3 option. The IBM ILOG CPLEX Version 12.5.1 was used as a solver for the mathematical programming depicted in FIG. 6A with the default parameter settings, including the number of threads (which was set to 16). The experiments converted all of the graphs to simple undirected graphs by removing self-loops and redundant edges.

As shown in FIG. 8, density function $f(S)=e[S]-a|S|(|S|-1)/2$, which is the density function proposed in the above-described definition of f(S) are found in the previously described publication written by C. E. Tsourakakis, F. Bonchi, A. Gionis, F. Gullo, and M. A. Tsiarli, titled "Denser Than The Densest Subgraph: Extracting Optimal Quasi-Cliques with Quality Guarantees," published in Proceedings of KDD (2013), the entire disclosure of which is incorporated by reference herein. In this reference, Tsourakakis et al. recommends that parameter "a" is set such that $\frac{1}{3}<=a<1$. In contrast, in the disclosed density function $f(S)=e[S]/|S|^a$, according to one or more embodiments, parameter "a" is set such that $1<=a<=2$. The table shown in FIG. 8 is based on use of an adjnoun graph of 112 vertices and 425 edges as an input. The adjnoun graph is a known dataset that contains the network of common adjective and noun adjacencies for the novel "David Copperfield" by Charles Dickens, as described by M. Newman. Vertices represent the most commonly occurring adjectives and nouns in the book. Vertex values are zero (0) for adjectives and one (1) for nouns. Edges connect any pair of words that occur in adjacent position in the text of the book. As shown in FIG. 8, for various values of parameter "a," the range of the sizes of the optimum solution using the density function g(S) of one or more disclosed embodiments is broader than the range of sizes of the optimum solution using f(S) taken from the previously described publication written by C. E. Tsourakakis, F. Bonchi, A. Gionis, F. Gullo, and M. A. Tsiarli, titled "Denser Than The Densest Subgraph: Extracting Optimal Quasi-Cliques with Quality Guarantees," published in Proceedings of KDD (2013), the entire disclosure of which is incorporated by reference herein.

Thus it can be seen from the foregoing detailed description that the present disclosure provides a number of technical benefits. One or more embodiments of the present disclosure recognize that it is both time consuming and extremely difficult to construct an exact algorithm that finds the optimum solution (i.e., the densest subgraph) in a very large graph G (e.g., more than approximately 500 vertices). However, the present disclosure uses the fact that it is possible to construct an efficient exact algorithm for relatively small graphs, wherein the number of vertices is no more than approximately five-hundred (500), to first quickly and efficiently find a relatively small graph, then apply a more exact solution to identify/confirm the densest subgraph from the small graph. For example, a typical size of an optimum solution most likely has between 10 and 50 vertices, and the largest optimum solution most likely has no more than approximately 200 vertices. Thus, one or more embodiment of the present disclosure operate to find an initial, suitable subset so that S overlaps considerably with the optimum solution. In other words, most of the vertices in the optimum solution are contained in S. One or more embodiments of the present disclosure then find a subset S*. It is postulated by the present disclosure that the subset S* is substantially identical to the optimum solution.

Figure 9:
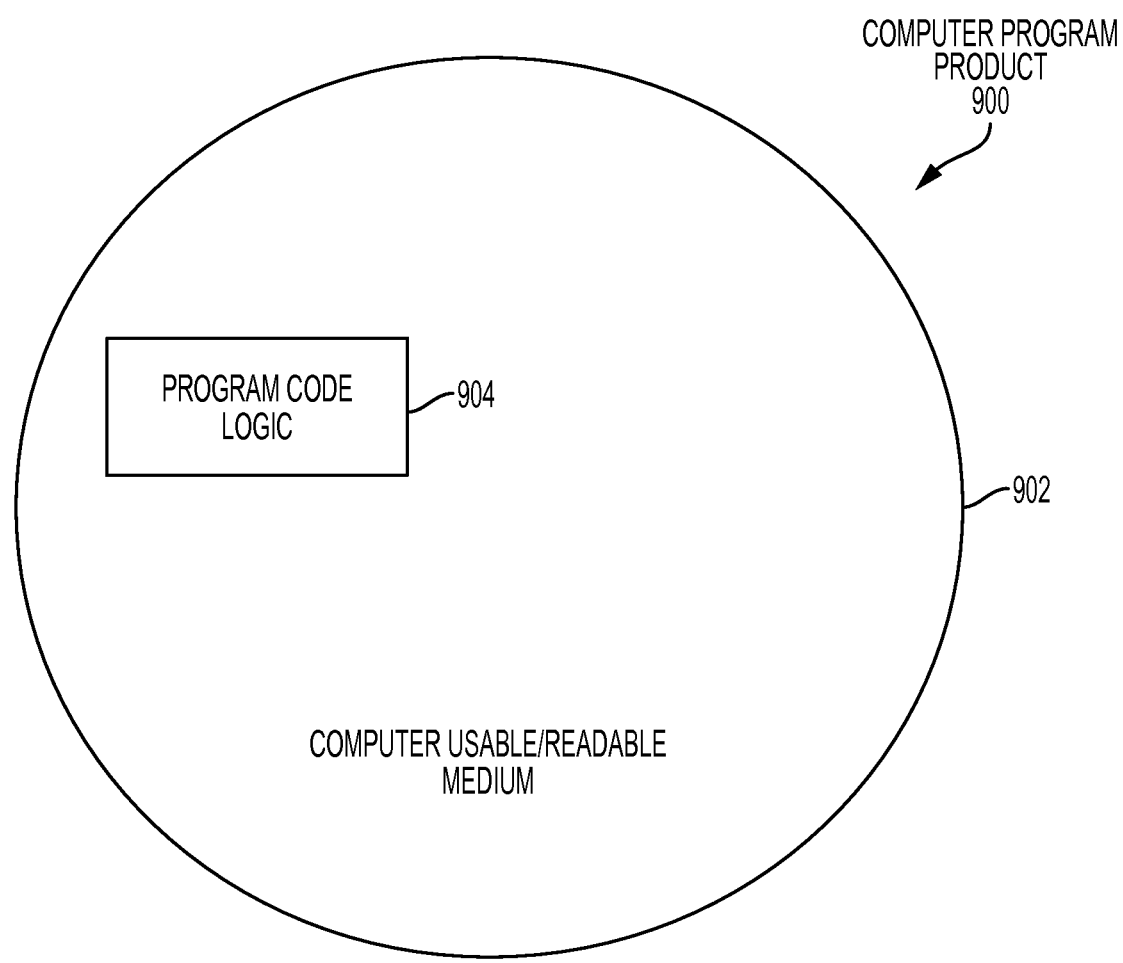
FIG. 9 depicts a computer program product in accordance with one or more embodiments.

Referring now to FIG. 9, a computer program product 900 in accordance with an embodiment that includes a computer readable storage medium 902 and program instructions 904 is generally shown.

The present invention may be a system, a method, and/or a computer program product. The computer program product may include a computer readable storage medium (or media) having computer readable program instructions thereon for causing either a single processor or multiple processors working together to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. A computer implemented method comprising:
performing, using a first processor, operations configured to generate a computer model of a system;
wherein the computer model identifies relationships between objects of the system;
wherein the system is selected from a group consisting of a physical system, a biological system, a social system, an information systems, and a social network system; and
wherein the operations include:
generating a graph (G) having a plurality of vertices (V) and edges (E); and
analyzing the graph to identify a subgraph (S) of vertices (V') of the graph;
wherein the subgraph comprises an exact subset;
wherein analyzing the subgraph comprises:
applying, by said first processor, a heuristic analysis to the graph to determine an initial subset of the graph; and
applying, by either said first processor or a second processor, an exact analysis to said initial subset to determine an exact subset of said initial subset;
wherein said exact subset of said initial subset comprises a dense subset of the graph;
wherein applying said exact analysis comprises applying a density function comprising:
a function $e[S]$ divided by $|S|^a$;
wherein, in the function $e[S]$, e comprises a number of the edges (E), and the function $e[S]$ comprises a number of the edges (E) in S; and
wherein the superscript parameter a in the density function comprises a fixed parameter set to be greater than or equal to one (1) or less than or equal to two (2).

2. The computer implemented method of claim 1, wherein said heuristic analysis comprises a greedy algorithm.

3. The computer implemented method of claim 1, wherein said exact analysis comprises a fractional programming technique.

4. The computer implemented method of claim 1, wherein the operations further include setting, by either said first processor or said second processor, a parameter t to a value within a predetermined range of values.

5. The computer implemented method of claim 4, wherein said parameter t impacts:
a quality level of said exact subset of said initial subset; and
a speed at which the method is implemented.

6. The computer implemented method of claim 4, wherein said predetermined range of values comprises from three-hundred (300) to five-hundred (500).

7. A computer system comprising:
a first processor configured to perform operations configured to generate a computer model of a system;
wherein the computer model identifies relationships between objects of the system;
wherein the system is selected from a group consisting of a physical system, a biological system, a social system, an information systems, and a social network system; and
wherein the operations include:
generating a graph (G) having a plurality of vertices (V) and edges (E); and
analyzing the graph to identify a subgraph (S) of vertices (V') of the graph;
wherein the subgraph comprises an exact subset;
wherein analyzing the subgraph comprises:
using the first processor to apply a heuristic analysis to the graph to determine an initial subset of the graph; and
using either said first processor or a second processor to apply an exact analysis to said initial subset to determine an exact subset of said initial subset;
wherein said exact subset of said initial subset comprises a dense subset of the graph;
wherein applying said exact analysis comprises applying a density function comprising:
a function $e[S]$ divided by $|S|^a$;
wherein, in the function $e[S]$, e comprises a number of the edges (E), and the function $e[S]$ comprises a number of the edges (E) in S; and
wherein the superscript parameter a in the density function comprises a fixed parameter set to be greater than or equal to one (1) or less than or equal to two (2).

8. The computer system of claim 7, wherein said heuristic analysis comprises a greedy algorithm.

9. The computer system of claim 7, wherein said exact analysis comprises a fractional programming technique.

10. The computer system of claim 7, wherein the operations further include using either said first processor or said second processor to receive a parameter t, wherein said parameter has been set to a value within a predetermined range of values.

11. The computer system of claim 10 wherein said parameter t impacts:
a quality level of said exact subset of said initial subset; and
a speed at which the method is implemented.

12. The computer system of claim 10, wherein said predetermined range of values comprises from three-hundred (300) to five-hundred (500).

13. A computer program product comprising:
a non-transitory computer readable storage medium having program instructions embodied therewith, the program instructions being readable by a processor circuit to cause the processor circuit to perform a method comprising:
performing, using a first processor of the processor circuit, operations configured to generate a computer model of a system;
wherein the computer model identifies relationships between objects of the system;
wherein the system is selected from a group consisting of a physical system, a biological system, a social system, an information systems, and a social network system; and wherein the operations include:
  generating a graph (G) having a plurality of vertices (V) and edges (E); and
  analyzing the graph to identify a subgraph (S) of vertices (V') of the graph;
wherein the subgraph comprises an exact subset;
wherein analyzing the subgraph comprises:
  applying, by the first processor, a heuristic analysis to the graph to determine an initial subset of the graph; and
  applying, by either said first processor or a second processor of the processor circuit, an exact analysis to said initial subset to determine an exact subset of said initial subset;
  wherein said exact subset of said initial subset comprises a dense subset of the graph;
  wherein applying said exact analysis comprising applying a density function comprising:
    a function e[S] divided by $|S|^a$;
    wherein, in the function e[S], e comprises a number of the edges (E), and the function e[S] comprises a number of the edges (E) in S; and
    wherein the superscript parameter a in the density function comprises a fixed parameter set to be greater than or equal to one (1) or less than or equal to two (2).

14. The computer program product of claim 13, wherein said heuristic analysis comprises a greedy algorithm.

15. The computer program product of claim 13, wherein said exact analysis comprises a fractional programming technique.

16. The computer program product of claim 13 further comprising setting, by either said first processor or said second processor, a parameter t to a value within a predetermined range of values.

17. The computer program product of claim 16 wherein said parameter t impacts:
  a quality level of said exact subset of said initial subset; and
  a speed at which the method is implemented.

* * * * *